June 20, 1967 J. G. LORD 3,326,462
STYLUS VOTING MACHINE
Filed June 29, 1965 11 Sheets-Sheet 1

FIG. 1

INVENTOR.
JOHN G. LORD
BY Louis Necho
ATT'Y.

June 20, 1967    J. G. LORD    3,326,462
STYLUS VOTING MACHINE
Filed June 29, 1965    11 Sheets-Sheet 2

FIG. 2

INVENTOR
JOHN G. LORD
BY Louis Necho
ATT'Y.

June 20, 1967  J. G. LORD  3,326,462
STYLUS VOTING MACHINE
Filed June 29, 1965  11 Sheets-Sheet 3 fig. 3 fig. 4

INVENTOR.
JOHN G. LORD
BY
ATT'Y.

June 20, 1967　　　　　　　J. G. LORD　　　　　　　3,326,462
STYLUS VOTING MACHINE

Filed June 29, 1965　　　　　　　　　　　　　　　11 Sheets-Sheet 4 fig. 5 fig. 7

INVENTOR.
JOHN G. LORD
BY
ATT'Y.

June 20, 1967      J. G. LORD      3,326,462

STYLUS VOTING MACHINE

Filed June 29, 1965      11 Sheets-Sheet 5 fig. 8 fig. 6 fig. 9

INVENTOR
JOHN G. LORD
BY
ATT'Y.

fig. 10 fig. 10A

June 20, 1967  J. G. LORD  3,326,462
STYLUS VOTING MACHINE
Filed June 29, 1965  11 Sheets-Sheet 7 fig. 11

INVENTOR.
JOHN G. LORD
BY
ATT'Y.

June 20, 1967 J. G. LORD 3,326,462
STYLUS VOTING MACHINE

Filed June 29, 1965 11 Sheets-Sheet 9 fig. 14

INVENTOR.
JOHN G. LORD
BY
ATT'Y.

June 20, 1967 J. G. LORD 3,326,462
STYLUS VOTING MACHINE

Filed June 29, 1965 11 Sheets-Sheet 10 fig. 15 fig. 17

INVENTOR
JOHN G. LORD
BY
ATT'Y.

June 20, 1967  J. G. LORD  3,326,462

STYLUS VOTING MACHINE

Filed June 29, 1965  11 Sheets-Sheet 11 fig. 16

INVENTOR.
JOHN G. LORD
BY
ATT'Y.

United States Patent Office 3,326,462
Patented June 20, 1967

3,326,462
STYLUS VOTING MACHINE
John G. Lord, Swarthmore, Pa., assignor, by mesne assignments, to Shoup Voting Machine Corp., Bala Cynwyd, Pa., a corporation of Pennsylvania
Filed June 29, 1965, Ser. No. 468,054
8 Claims. (Cl. 235—50)

My invention relates to a voting machine of the type shown in Shoup Patent No. 2,054,102, and subsequent Shoup patents.

One object of the invention is to produce an improved machine of the type set forth.

A voting machine of the type disclosed in said patent employs rotary voting spindles which are connected by butterfly cams to pull straps, the enlarged ends of which engage interlocks and so on. Conventionally, the voting spindles are rotated, in vote-casting direction, by keys similar to those shown in the patent aforesaid. To facilitate rotation of the spindles against the inertia and friction of the various parts mentioned, it has heretofore been necessary to make the spindle actuating keys long enough to provide adequate grip and leverage. Since the keys must be rotated about the axes of their respective spindles, it was also necessary that the spindles be spaced apart enough to accommodate the long keys and to provide room between adjacent keys for the fingers of the voter. This greatly limited the number of voting spindles which can be incorporated in a machine of practical dimensions.

It is therefore a further object of the invention to produce a voting machine in which the relatively widely spaced voting keys are replaced by relatively closely spaced openings; and in which the vote recording mechanisms are compact, and in which the vote-casting mechanisms are actuated by the insertion of a stylus into selected openings, thereby increasing the number of voting facilities without correspondingly increasing the size of the voting machine.

Machines embodying the disclosure of said Shoup patent and the disclosure of subsequent Shoup patents have been sold by the thousands and have operated successfully over more than thirty years. But, with the increasing number of offices to be filled, and with the increasing number of candidates and issues and parties, the voting machines have reached the maximum practical size and weight and have become more complicated, and more expensive to produce, and more difficult to prepare, or set up, for one election or another, under the laws of one State, or County, or another.

It is therefore a further object of the invention to produce a lighter and more compact machine, and one which is easier to prepare, or set up, without sacrificing the effective capacity of the machine.

A voting machine of the type referred to in said patent, has about ten vertical columns of voting spindles with something like forty spindles in each column and a permanently built-in counter for each voting spindle. The vote counters of each column are operatively connected to a counter-shifter mechanism which moves all of the counters into a first position in which they are engaged with, and can be turned by, the rotation of the voting spindles in vote-casting direction, and into a second position in which the counters are unaffected by the resetting, or reverse rotation, of the voting spindles. Shifting all of the counters of the machine, even if only a fraction of the number of the spindles in any one column is used, represents unnecessary work, and since a voting machine is rarely used at full capacity, the presence of a full complement of counters, one for each spindle represents unneeded weight and expense.

It is therefore a further object of the invention to produce a voting machine wherein only the number of counters actually required for a given election need be installed in the machine.

The vote counters must all be re-set to zero before each election, and when the counters are preassembled, or built into the voting machine this is somewhat difficult, and time-consuming.

It is therefore a still further object to produce an improved voting machine wherein the counters are individually housed and detachably mounted in the machine so that they may be re-set to zero outside of the voting machine and then placed in their operative positions in the machine.

It is desirable to allow a voter who changes his mind after having turned one or more voting spindles in vote casting direction, to return such spindles to their inoperative position and to turn other voting spindles.

It is therefore a still further object of the invention to provide simple means, operable by the voter, for clearing the machine easily, quickly, and without external assistance so as to enable a voter to make another selection.

It sometimes happens that a voter does not wish to cast any vote but for obvious reasons, he finds it inexpedient to stay away altogether.

It is therefore another object of the invention to produce a machine whereby the voter can put the machine through a simulated voting-operation, so as to preserve his privacy without actually casting any vote.

The full nature of the invention will be understood from the following specification and the accompanying drawings in which.

In the following description, "front" will refer to the side of the machine which faces the voter, "inner" will refer to parts located inwardly of the front, side and rear walls of the machine, and "outer" will refer to parts located on, or located closer to the outside walls than other parts.

Figure 1:
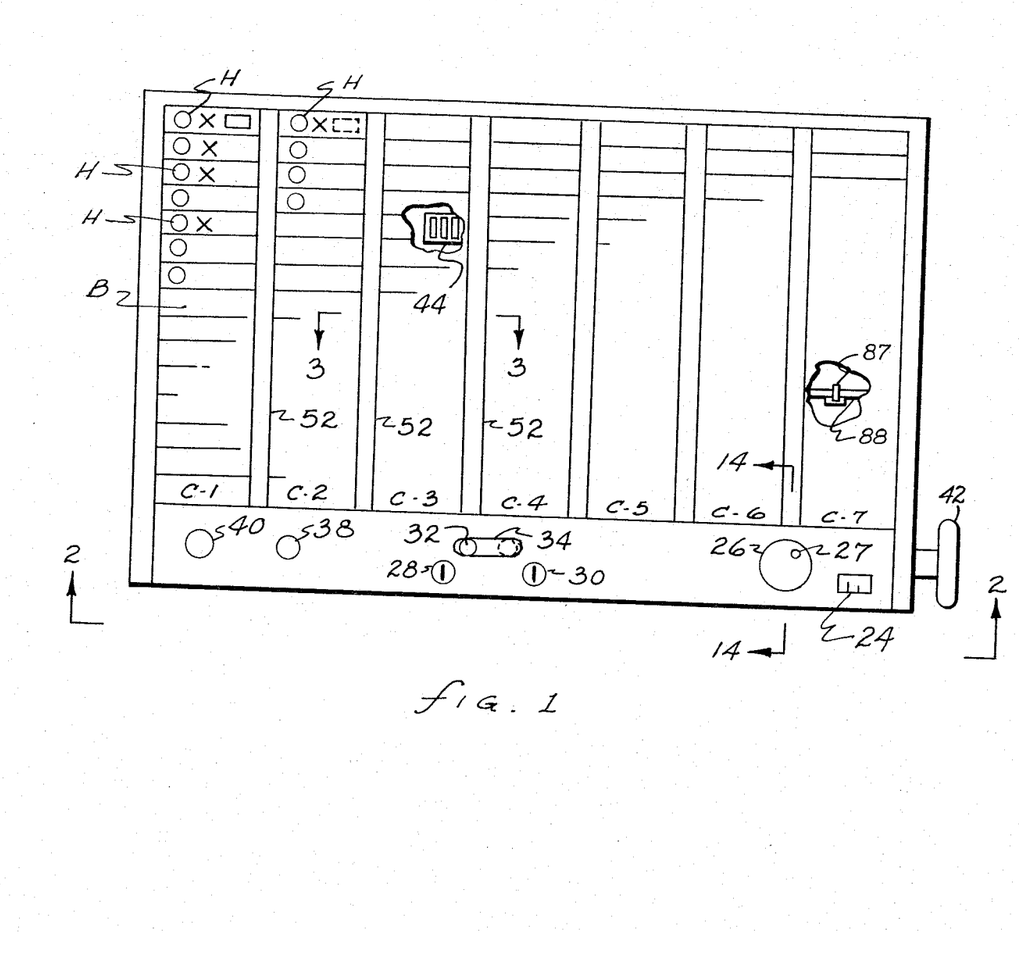
FIG. 1 is a front elevational view of a machine embodying the invention.
Figure 2:
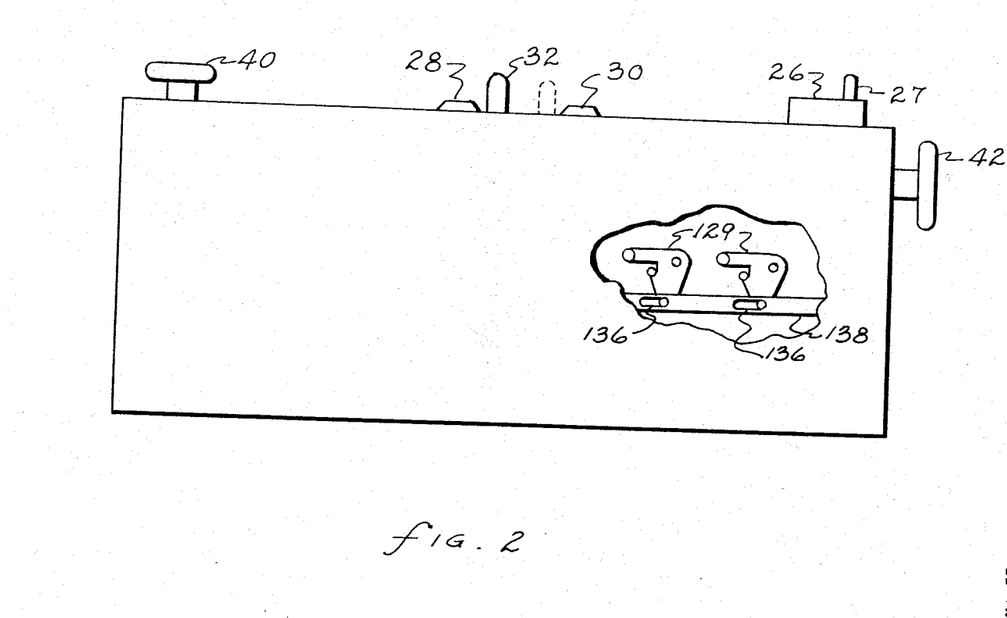
FIG. 2 is a bottom plan view of the same looking in the direction of line 2—2 on FIG. 1.
Figure 3:
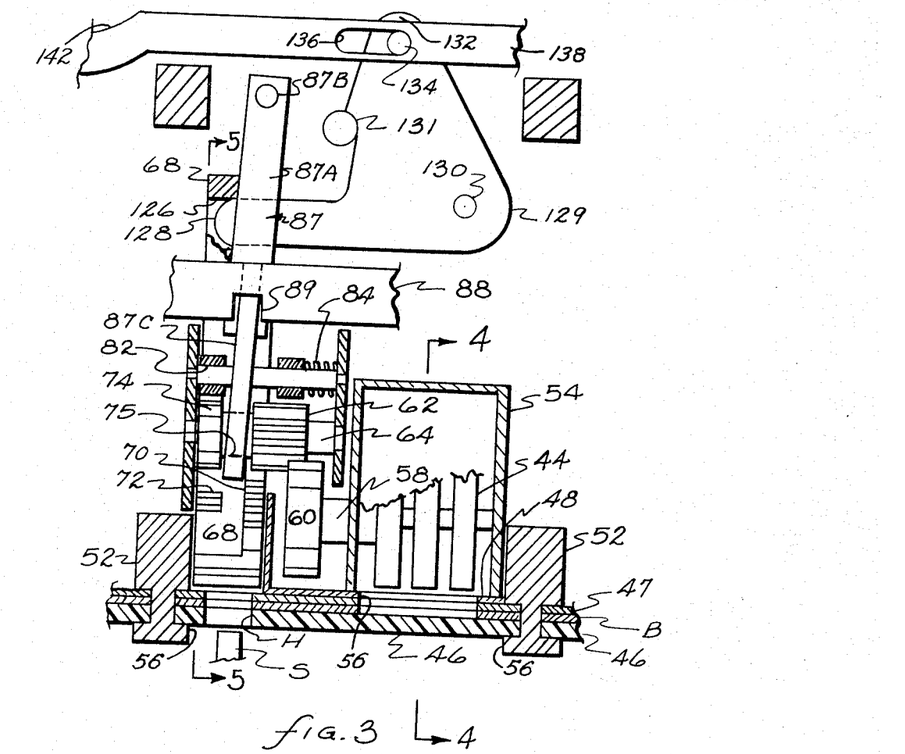
FIG. 3 is an enlarged sectional view looking in the direction of line 3—3 on FIG. 1.
Figure 4:
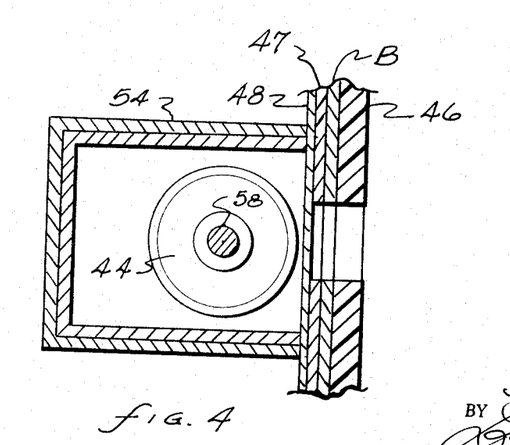
FIG. 4 is a sectional view looking in the direction of line 4—4 on FIG. 3.

In a voting machine of the type as illustrated, the front of the machine, that is, the side which faces the voter, exhibits a number of vertical columns C–1 to C–7 which are defined by spaced uprights 52, (see FIGS. 1 and 3). The juxtaposed vertical edges of uprights are grooved to receive the opposite vertical edges of removable ballots B which are located between an outer transparent cover 46 and an inner retainer 47. Each cover 46 is provided with holes H, which register with holes in ballot B and in retainer 47, for receiving a stylus S, FIG. 3, which when inserted into a hole H registering with the name of a candidate X on ballot B, activates the corresponding vote-casting mechanism hereinafter described to cast a vote for said candidate and to record the vote on associated counter 44. The term candidate as used herein includes any question or issue to be voted on. The front of the machine also exhibits a conventional counter 24 which is always visible and which shows the number of persons who used the machine with no reference to the number of votes actually cast. The machine also includes a crank 26 which is rotatable by a handle 27 and which must be rotated by the voter to complete the voting cycle. The machine also has a handle 32 which slides in a horizontal slot 34 to open and close the machine. Movement of handle 32 to "open" position also moves shutters 48, which are mounted inwardly of retainers 47, in a direction to conceal counters 44. When handle 32 is in "closed" position at the end of the voting period, shutters 48 are moved to uncover counters 44 to permit the total count for each candidate to be read from the counter opposite his name. Handle 32 is secured in either position by locks 28 and 30 which are operated by keys held by watchers of different parties. The specific structure of locks 28 and 30 forms no part of this invention and is therefore not shown nor described but an equivalent mechanism is shown in one or more of the Shoup patents. Also accessible at the front of the machine is a hole 38 into which the stylus used in voting may be inserted to cause the machine to go through the motions of voting without actually casting any vote. The front of the machine also includes a knob 40 which may be pulled out to clear the machine so as to enable a voter to change his vote at any time prior to having turned crank 26. On the side of the machine there is an election officer's latch 42 which must be pulled out before each successive voter can use the machine.

According to this invention, each counter 44 is housed in a casing 54 which is insertable and removable, as a unit, through opening 56 which is defined by the opposed faces of uprights 52, and which becomes accessible upon removal of cover 46, the ballot B, retainer 47, and shutter 48. Each counter 44 has a shaft 58 which projects from the inner side of its casing 54 and carries a pinion 60 which, when the counter is in position, as shown in FIG. 3, always meshes with gear 62 which is freely rotatable on, and is axially slidable relative to, a suitably journalled shaft 64.

Figure 5:
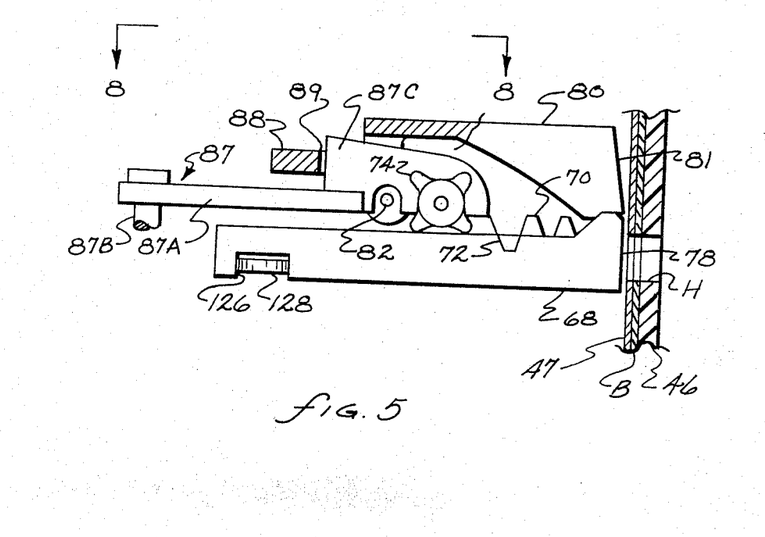
FIG. 5 is an enlarged sectional view looking in the direction of line 5—5 on FIG. 3, showing the machine ready for, but before a vote has been cast.
Figures 6, 9:
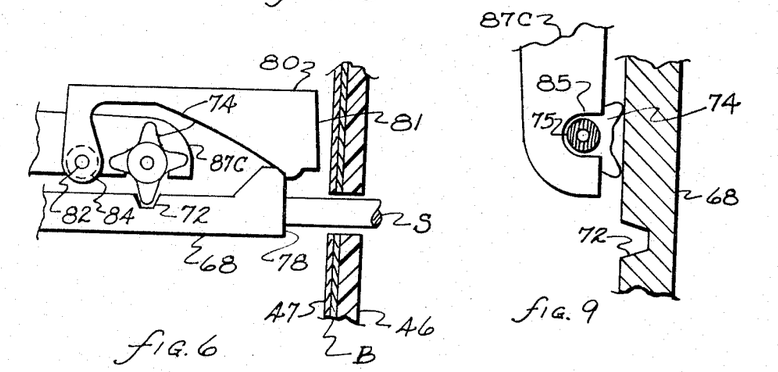
FIG. 6 is a view similar to FIG. 5 but showing the machine in the process of casting a vote.
FIG. 9 is a fragmentary, enlarged, view looking in the direction of line 9—9 on FIG. 8.
Figure 7:
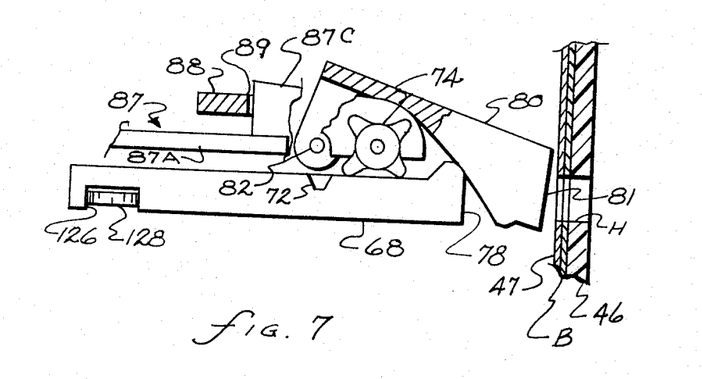
FIG. 7 is a view similar to FIG. 6 but showing the machine after the casting of one vote has been completed.
Figure 10:
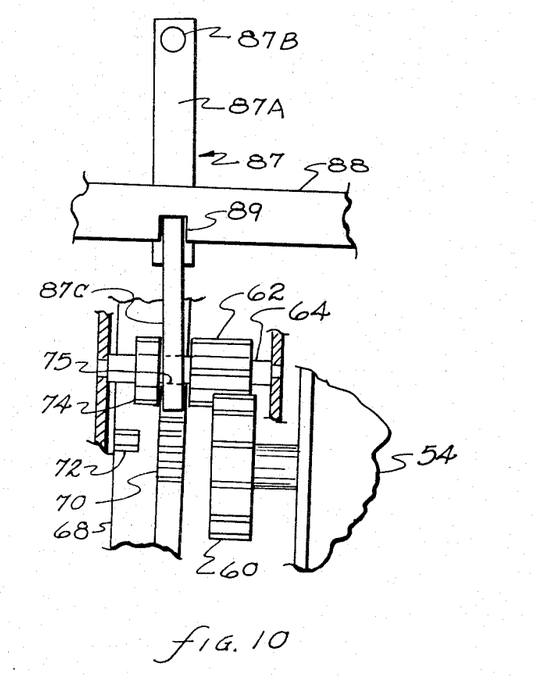
FIG. 10 is similar to FIG. 8 but showing the counter shifter assembly in counter disengaging position.
Figure 10A:
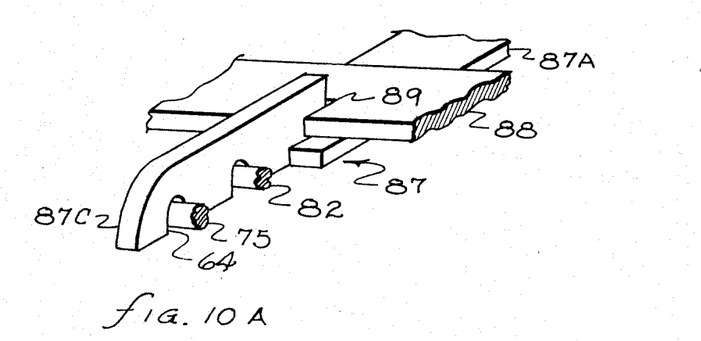
FIG. 10A is a view showing details of the vote counter shifter pawl which is shown in FIG. 9.

Below gear 62 is a horizontally reciprocable arm 68 which carries a rack 70 and is provided with a recess 72. When the parts are in the position shown in FIG. 8, gear 62 will mesh with gear 60 and with rack 70, and recess 72 will be in alignment with a pinion 74 which is fixedly connected with gear 62 by neck 75. It will be noted, especially from FIGS. 5, 7 and 10, that as long as pinion 74 rides on the flat surface of arm 68, neither the pinion 74 nor gear 62 can turn, and the corresponding counter is immobilized. But, when arm 68 is moved to the position to bring recess 72 into alignment with pinion 74, gear 62 will be turned by rack 70 and will turn the corresponding vote counter. In other words, until arm 68 is moved to the position of FIG. 6 by the insertion of a stylus, the vote counter can not be turned, in either direction. The outer, or righthand, end 78 of arm 68, as viewed in FIGS. 5 and 7, is painted white, or is otherwise distinctively marked, so that, when the parts are in the position of FIG. 5, end 78 of arm 68 will be visible through corresponding hole H, to indicate that the machine is ready for use in the sense that, other things being in order, the insertion of a stylus will displace arm 68 and will cast a vote. To prevent voting more than once for the same candidate, I provide locking member 80 which is pivoted at 82 and is normally biased by a spring 84 from the position of FIG. 5 to the position of FIG. 7, in which its outer end 81 completely blocks the corresponding hole H to prevent access to arm 68 by the stylus, or anything else, until the machine has been cleared, or re-set, and arm 68 and locking member 80 have been returned to the ready-to-vote position of FIG. 5. The end 81 of arm 80 is painted red, or is otherwise marked to indicate that this particular voting mechanism is unavailable.

Figure 8:
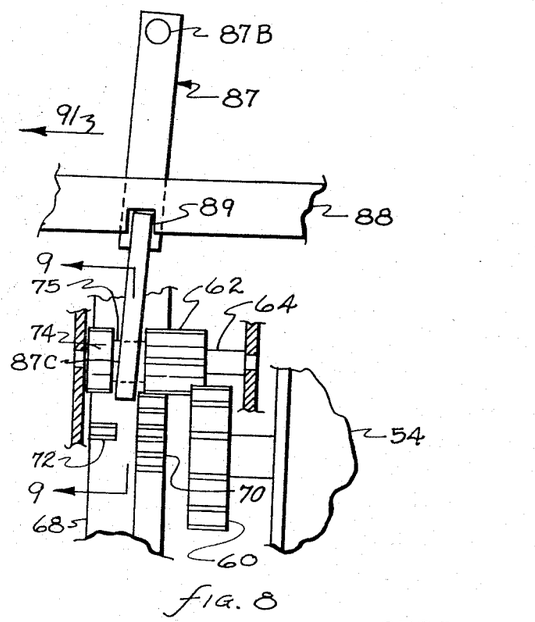
FIG. 8 is a sectional view looking in the direction of line 8—8 and is, in effect, an enlargement of the corresponding portion of FIG. 3 and showing the counter shifter in counter engaging position.

To prevent counter rotation of the wheels of the vote counter upon return movement of arm 68 to the position of FIG. 5, I provide safety means for preventing engagement of gear 62 with rack 70 and for preventing entry of pinion 74 into recess 72. As best shown in FIGS. 5, 8 and 9, the safety means referred to includes a vote counter shifter arm 87 which is formed of an inner flat portion 87a, and an outer, raised portion 87c, FIG. 5, and is pivoted at 87b for movement to the right or left, as viewed in FIG. 8. The outer end of raised portion 87c has a notch 85, FIG. 9, which straddles neck 75 which connects pinion 74 to gear 62. The inner end of portion 87c of arm 87 engages a notch 89 which is formed in a reciprocable bar 88. By this arrangement, when bar 88 is moved to the left, or in the direction of arrow 91 in FIG. 8, counter shifter bar 87 will move to the position of FIGS. 3 and 8 in which pinion 74 aligns with recess 72 and gear 62 aligns with rack 70. When reciprocable bar 88 is moved in the opposite direction, it moves bar 87 to the position of FIG. 10 in which pinion 74 does not align with recess 72 and gear 62 does not align with rack 70, so that arm 68 can be returned to the position of FIG. 5 without turning the vote counter wheels in vote-cancelling direction. It will be understood that there is a bar 88 for each horizontal row of voting spindles, as diagrammatically shown in FIG. 1, and that there is a bar 87 for every voting spindle.

Figure 11:
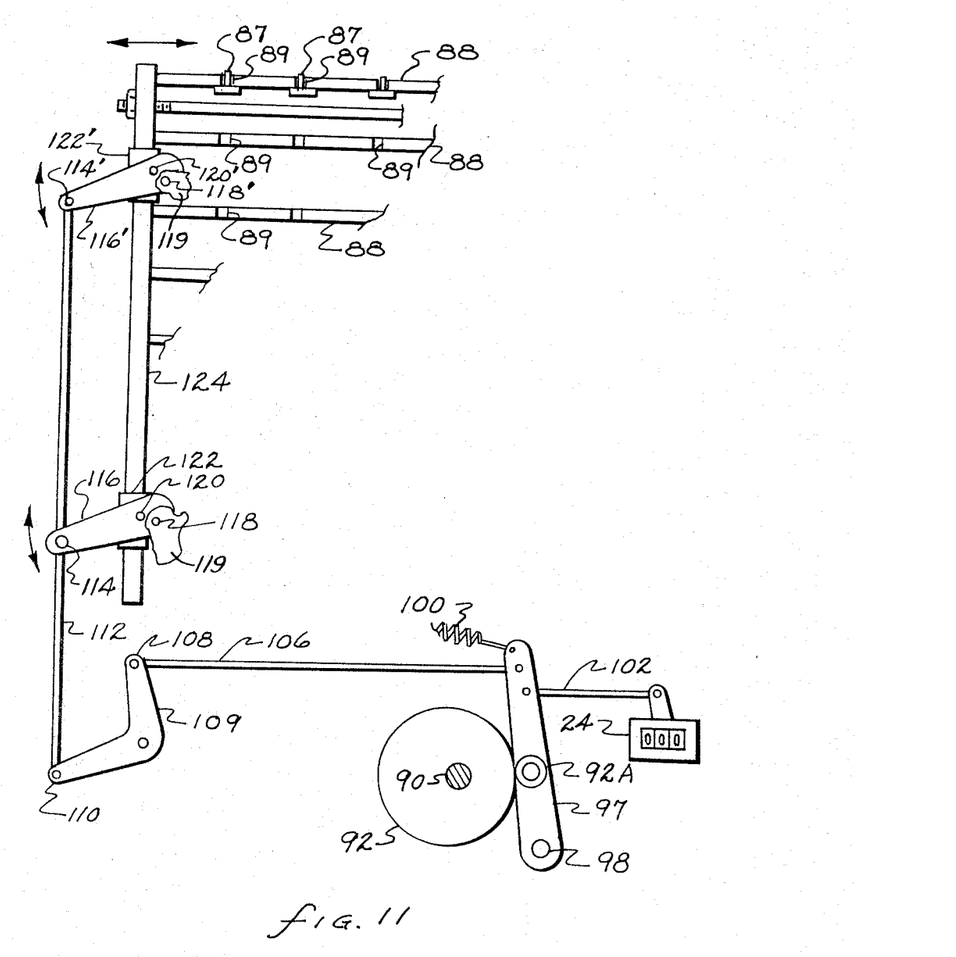
FIG. 11 is a front elevational view of the counter shifter actuating linkage.
Figure 14:
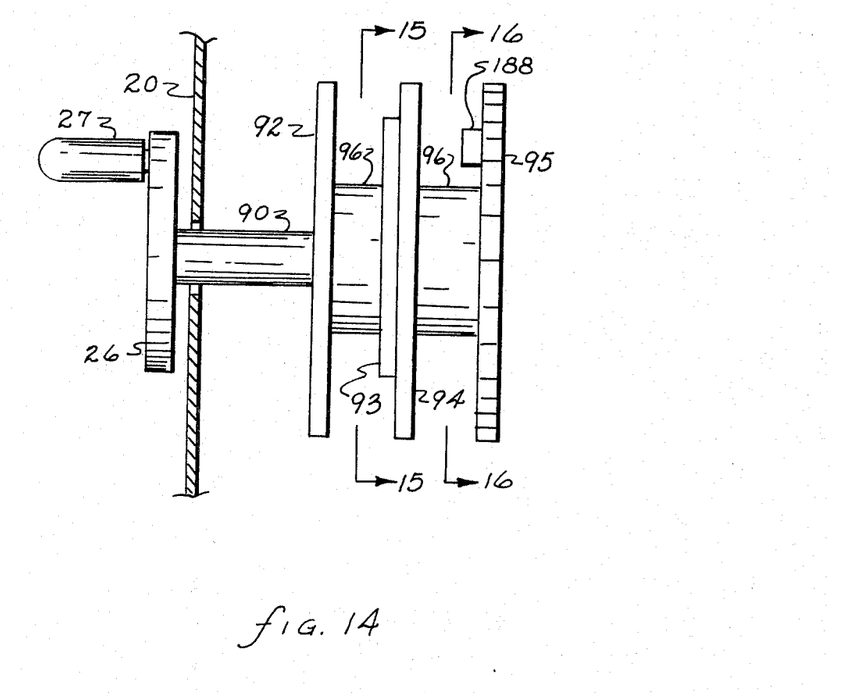
FIG. 14 is an enlarged sectional view looking in the direction of line 14—14 on FIG. 1 and showing the cam assembly.

Rotation of crank 26 by handle 27 turns cam shaft 90 which carries cams 92, 93 and 94 and ratchet wheel 95, which are separated by spacers 96, FIG. 14. Cam 92 is engaged by a follower roll 92a, FIG. 11, which is carried by lever 97 which is pivoted at 98 and is biased by spring 100 to keep roll 92a in constant engagement with cam 92. Since cam 92 is eccentrically carried by cam shaft 90, it follows that rotation of cam shaft 90 causes lever 97 to oscillate about the axis of its pivotal mounting 98. The free end of lever 97 is connected by link 102 to public vote counter 24 whereby, every time lever 97 moves to the right, as viewed in FIG. 11, counter 24 adds one vote. It will be understood that the opposite movement of lever 97 does not affect the public counter. Since the counter is a purchasable item, which has been known for many years and since its structure and operation are not claimed as the invention of applicant, it is not shown nor described.

Lever 97 is also pivotally connected by link 106 to one end 108 of a pivoted bell crank 109, the other end 110 of which is pivotally connected to the lower end of rod 112 which is pivoted at 114 to the end of an arm 116 which is pivoted at 118 to the frame 119 of the machine. At its upper end, rod 112 is again pivoted, at 114′, to the end of an arm 116′, which is identical with arm 116. Arms 116 and 116′ are pivoted at 120 and 120′ to sleeves 122 and 122′ which are freely movable relative to rod 124. By this arrangement, counter-clockwise rotation of bell crank 109 moves rod 112 upwardly, and, through arms 116 and 116′, moves rod 124 to the right or in the direction as shown by the double headed arrow at the top of FIG. 11.

Figure 12:
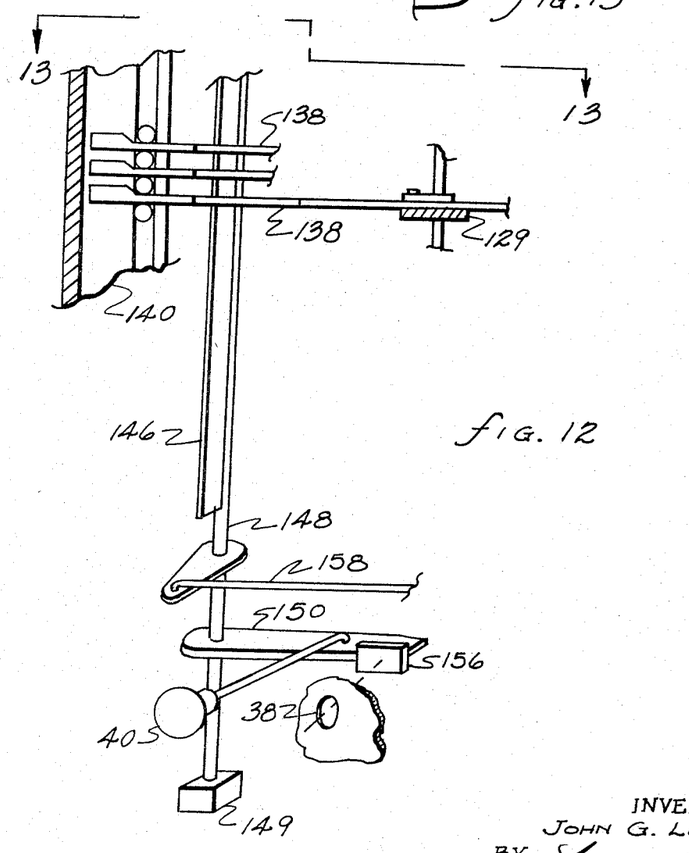
FIG. 12 is a perspective view showing some of the operating linkage.
Figure 13:
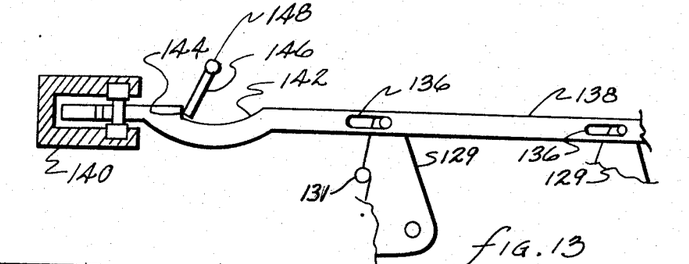
FIG. 13 is a top plan view looking in the direction of 13—13 on FIG. 12.

Rod 124 extends from the top to the bottom of the machine and carries, or is connected to, all of the previously mentioned bars 88. Since all of these reciprocable bars are identical, it is thought that a description of one of them will suffice. As can be seen from FIG. 11, each bar 88 is provided with spaced notches 89 which are adapted to receive the corresponding counter shifter bars 87 of a given horizontal row of voting spindles to reciprocate them between the positions of FIGS. 3 and 10. In other words, rotation of cam 92, reciprocates all of the bars 88 and reciprocates all of the counter shifter arms 87 of the machine. The inner end of arm 68 is provided with a notch 126, FIGS. 3 and 5, which engages one end 128 of a bell crank lever 129 which is pivoted at 130, and the other end 132 of which carries a pin 134 which moves in slot 136 in an otherwise conventional pull strap 138, one end of which is engaged in a conventional interlock 140, FIG. 12. Rotation of lever 129 is limited by a stop 131. Each pull strap 138 has an arcuate recess 142 in its rear face which terminates in a straight edge 144, FIG. 13, which is engageable with the end of an elongated slat 146, FIG. 12, which is rigidly carried by shaft 148 which is journalled as at 149 for rotation about its vertical axis. Shaft 148 is located inwardly of, and is connected to pull handle 40 by link 150 which permits a voter who has changed his mind, to clear the machine and start over again by merely pulling handle 40. As can be seen from FIG. 12, outward movement of handle 40 rotates shaft 148, in clockwise direction to cause slat 146 to engage flat edge 144 of the pull strap 138 and to push the strap back into the interlock, or to the left as viewed in FIG. 12. This movement of the pull strap rotates the corresponding bell crank 129 in counter-clockwise direction as viewed in FIG. 3, to move the corresponding arm 68 outwardly, or from the voted position of FIG. 7, to the unvoted position of FIG. 5 which causes rack 70 to rotate gear 62 to turn the vote counter wheels in vote-cancelling direction to subtract the vote which was cast.

Figure 15:
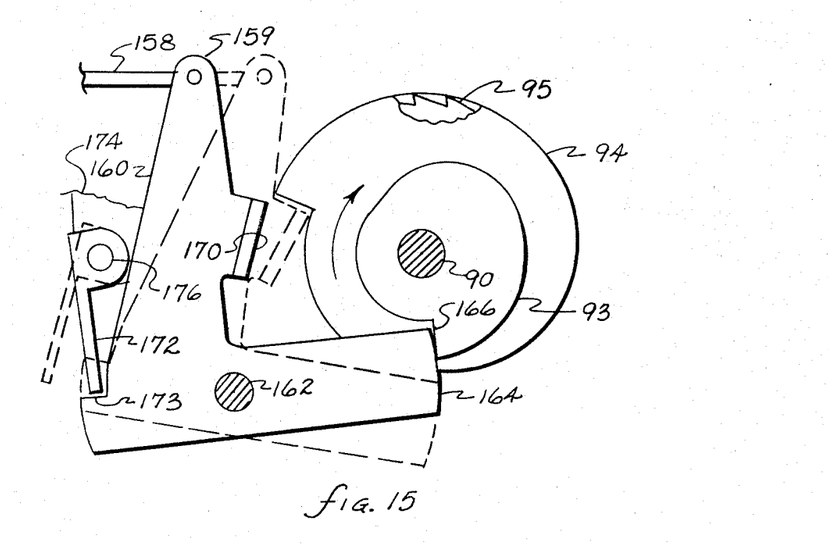
FIG. 15 is a sectional view looking in the direction of line 15—15 on FIG. 14.
Figure 16:
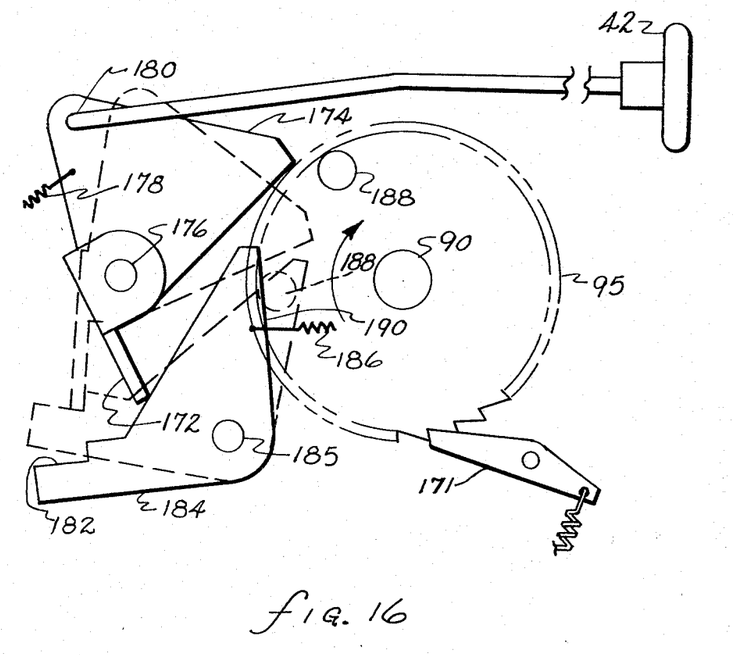
FIG. 16 is a sectional view looking in the direction of line 16—16 on FIG. 14.
Figure 17:
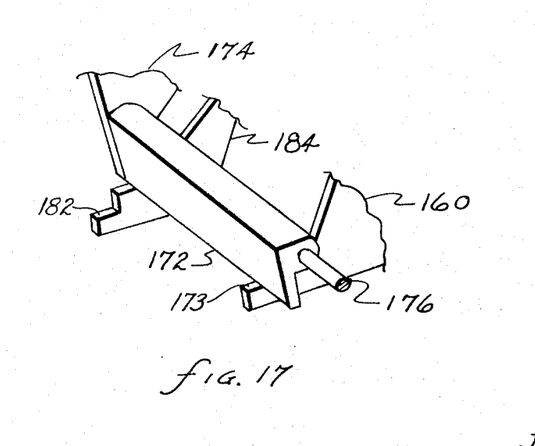
FIG. 17 is a fragmentary and diagrammatic view showing the relation of some of the parts shown in FIGS. 15 and 16.

As will be later explained, the machine is so constructed that officer's latch 42 must be pulled out before a voter can cast his vote, and once it has been pulled out it can not be moved back, in unless at least one vote has been cast. This immobilization of the officer's latch reveals that the voter did not vote at all. To avoid this embarrassing disclosure, link 150 has a pad 156 which registers with hole 38 in the front of the machine so that insertion of the stylus sufficient force, will rotate shaft 148 in counter-clockwise direction as viewed in FIG. 12 to move link 158 to the right as viewed in FIGS. 12 and 15. The other end of link 158 is connected to one end 159 of a bell crank lever 160 which is pivoted at 162 and the other end 164 of which is adapted to abut a flat edge 166 on cam 93. It will be evident from FIGS. 15 and 16 that with the parts in the solid line position of FIG. 15, cam shaft 90 is prevented from turning in clockwise direction by the end 164 of bell crank lever 160 abutting flat edge 166 of cam 93, and is prevented from turning in the opposite direction by pawl 171 engaging ratchet wheel 95. If shaft 90 can not be turned, it follows that crank 26 also can not be turned by a voter who pretends to, but does not actually vote at all. But, it will be evident also that rotation of shaft 148 by the insertion of the stylus through hole 38 causes link 148 to move lever 160 from the solid, to the broken line position in FIG. 15. This moves the end 164 of the bell crank lever out of the path of flat 166 of cam 93 and, in the absence of other obstructions, permits rotation of shaft 90 by crank 26 in the same manner as if shaft 148 had been rotated by movement of pull strap 138 out of interlock 140 as a voter casts his vote as above set forth. Rotation of the shaft 90 by crank 26 gives the observers the impression that the voter did cast a vote, in fact, he did not. Rotation of shaft 90 also actuates public counter 24 which, as previously explained, only shows the number of persons who used the machine regardless of whether any votes were actually cast.

In order to re-set the machine, bell crank lever 160 is provided with a pad 170 which, when this lever is in the broken line, or "voted" position, projects into the path of cam 94. By this arrangement rotation of shaft 90 in the direction of the arrow in FIG. 15, brings the high surface of cam 94 to bear against pad 170 and will push lever 160 back to the solid line position. This movement of lever 160 rotates shaft 148 in clockwise direction and moves pull straps 138, voting arms 68, counter shifter bars 87, and all associated parts to their unvoted positions in which machine is available for use by the next voter. In other words, each rotation of crank 26 by one voter re-sets the machine for use by the next voter. But, as can be seen from FIG. 15, bell crank lever 160 can not be moved from the solid to the broken line position as long as the corresponding portion of elongated latch 172 engages shoulder 173 of lever 160. As can be seen from FIG. 16, latch 172 is secured to another bell crank lever 174 which is pivoted at 176 to the frame of the machine and which is biased, counterclockwise, or to the left, in FIG. 16, by spring 178. Lever 174 is pivoted, at 180, to the inner end of officer's latch 42. With the officer's latch pushed in, to the left in FIG. 16, levers 174 and 184 and latch 172, will assume the solid line position of FIG. 16 and lever 160 will be in solid line of FIG. 15, in which crank 26 cannot be moved and the machine is locked. To unlock the machine, the election officer pulls knob 42 to the right in FIG. 16 to move levers 174 and 184, and latch 172, to the broken line position of FIG. 16, thus disengaging latch 172 from shoulder 173 of lever 160 and permitting rotation of the latter by either the pretended, or real casting, of a vote in the manner above described. It will be observed that, with the officer's latch pushed in, as FIG. 16, a portion of latch 172 bears against and prevents clockwise rotation of lever 184 in response to the action of spring 186. When the officer's latch is pulled out, lever 174 is moved to the broken line position and spring 186 moves lever 184 to the broken line position in which a portion of latch 172 will abut shoulder 182 of lever 184 to lock lever 174 in its broken line position and to prevent the officer's latch from being pushed in before a vote has been cast and until the parts are re-set as hereinafter described.

Rotation of shaft 90 by the voter turning crank 26 brings pin 188 to bear against lever 184 and pushes it back to its solid position to disengage latch 172 from shoulder 182 and to permit spring 178 to rotate lever 174 counter-clockwise to pull officer's latch 42 in again. If the officer should, deliberately, or otherwise, hold on to latch 42 in mid-position, or should latch 42 be jammed, further movement of pin 188 will be obstructed and will make further rotation of ratchet 95, and hence crank 26, impossible. This puts the voter, and others, on notice that something is wrong.

*Operation*

To prepare the machine for an election, the vote counters which are to be used are re-set to zero and handle 32 is moved to machine closing position, and locks 28 and 30 are operated to retain the handle in said position. To make the machine available, locks 26 and 30 are operated to permit handle 32 to be moved to machine open position and to lock it in this position. The officer's latch is now pulled out and the voter can insert a stylus S into a hole H to vote for the candidate whose name appears next to said hole.

Insertion of the stylus moves voting arm 68 inwardly or from the position of FIG. 5 to the position of FIG. 7 to engage vote counter gear 62 with rack 70 to turn the counter wheels in vote adding direction. This movement of voting arm 68 also moves the corresponding pull strap 138 out of its interlock and moves reciprocable bars 88 (each of which engages all of the counter shifter arms 87 in a given row), to move the corresponding counter shifter bars 87 to the position of FIG. 10 to prevent reverse rotation of the counter wheels in vote cancelling direction. As pull strap 138 moves out of interlock 140, edge 144 engages slat 146 to rotate shaft 148 to move lever 160 to the broken line position of FIG. 15 to permit rotation of shaft 90 as a voter turns crank 26. Since the lack of a vote prevents rotation of shaft 90 inasmuch as lever 160 engages flat 166 of cam 93, this fact is concealed by inserting stylus S through hole 38 to rotate shaft 148 to move lever 160 to the broken line position of FIG. 15. To allow a voter to cancel his selection and to start over again, it is merely necessary to pull out knob 40 which rotates shaft 148 to push pull straps 138 back into interlock 140. It will be noted that a complete revolution of crank 26 and cam shaft 90 and the cams thereon is needed to re-set the pull straps to permit latch 42 to be pulled back in and to return voting arms 68 to their initial position while by-passing the counter wheels to prevent cancellation of the vote. When the election is finished, locks 28 and 30 are unlocked to permit handle 32 to move to machine "closed" position and then locked until the machine is needed again. When handle 32 moves to its "closed" position, shutters 48 are moved to uncover counters 44 to permit counting of the votes for all the candidates. The manner in which this is accomplished is shown in Shoup patent aforesaid, and is therefore not shown nor described.

It will be noted that each cover 46 has a full complement of holes representing the maximum capacity of one column of the machine, whereas each ballot for each given election will only have such holes punched in it as are needed to permit voting for the candidates running in that particular election. A ballot having only the necessary holes, blanks out the remaining holes to avoid confusion, and prevent tampering. The arrangement is such that when a ballot is placed in position, the holes in it will align with the corresponding holes in cover 46. As stated above, only as many counters as are needed are re-set outside of the machine and placed therein to correspond to the names of the candidates. It will be further noted that no access to the counters can be had until the ballot and the front wall of the machine, that is, cover 46, retainer 47, and shutter 48, have been removed from upright 52.

The holes H take very little room and the area needed for the name of the candidate is enough to accommodate voting arm 68 and counter 44 associated therewith. Since there are no keys to turn, very little space need be provided between adjacent holes, and therefore, the capacity of the machine is greatly increased.

The provision of means for allowing a voter, so inclined, to go through the motions of voting without actually casting a vote, is important, because it insures the voter's right of privacy.

What I claim is:
1. In a voting machine the combination of:
reciprocable means,
said means being reciprocated from an unvoted to a voted position by an external stylus and
said means being detachably engageable with a counter pinion gear rotatable upon a counter shaft;
pull strap means operated by the said reciprocable means,
said pull strap means reciprocating between an initial position corresponding to the unvoted position of said reciprocable means and being pulled to a release position when said reciprocable means are urged to the voted position;
a shaft carrying an extended slat,
said slat contacting a portion of said pull strap means, and
said shaft being rotated by said pull strap means when the reciprocable means move to the said voted position; and
cam means rotatable on a common shaft,
a portion of said means being released by action of the said slat when said reciprocable means are moved to the said voted position.

2. In a voting machine, the combination of:
an enclosing housing,
said housing being provided with a plurality of stylus-receiving openings;
reciprocable means arranged within the said housing,
said means being aligned with the said openings and said means being movable rearwardly from an unvoted position to a voted position by a stylus inserted through the said openings;
counter means engageable by the said reciprocable means as the reciprocable means are urged to the voted position,
said counter means being driven by pinion gear,
said gear being slidable along a counter shaft;
pull strap means operable by the rearward movement of the said reciprocable means, said pull strap means having linear motion in a direction other than in alignment with the direction of travel of the said reciprocable means;
rotatable means carried within the said housing, said rotatable means being revolved in a counter-clockwise direction by the said pull strap means and
said rotatable means releasing a cam stop in response to forces relayed by the pull strap means upon rearward movement of the reciprocable means; and
cam means rotatable by a handle placed externally of the said housing,
said cam means being operable only after the release of the said cam stop;
said cam means revolving the said rotatable means in a clockwise direction to return the said reciprocable means to their unvoted position by forces transmitted through the said pull strap means; and
counter shifter means operable upon rotation of the said cam means,
said counter-shifter means urging said pinion gear along said counter shaft out of engagement with said reciprocable means whereby said counter means continue to record the cast vote upon return of the said reciprocable member to the unvoted position.

3. The invention of claim 2 wherein the said reciprocable means include indicia visible through the said opening to indicate the respective voted and unvoted positions, and wherein the voted position indicator overlies the unvoted position indicator when the said means are urged to their rearward position.

4. The invention of claim 2 wherein external means are provided to revolve the said rotatable means in a clockwise direction without operation of the said cam means, and wherein said external means include an arm secured to the said rotatable means, said arm being pulled forwardly by a connected link extending through the said housing.

5. A voting machine including:
a removable front wall having openings therethrough,
voting arms disposed inwardly of said openings and movable, in vote casting direction, by a detachable stylus inserted through a corresponding opening,
a plurality of individual vote counters detachably mounted adjacent selected voting arms, and
complementary connecting means carried by said counters and said arms for detachably, operatively connecting said counters to adjacent voting arms whereby the movement of a voting arm in vote casting direction, rotates the corresponding counter in vote adding direction.

6. A voting machine including:
a casing,
a vote casting mechanism in said casing,
an operating handle located outside of said casing and movable in machine operating direction,
locking means for preventing movement of said handle,
first release means operable by the casting of at least one vote for releasing said locking means, and
a second release means operable independently of said first release means to release said handle irrespective of the casting of a vote.

7. A voting machine including a front wall having relatively small and relatively closely spaced openings therethrough adapted to receive a stylus,
a plurality of individual vote-casting voting mechanisms accessible through said openings and activated by a stylus insertable through said openings, for moving said vote-casting mechanisms to voting position, and
means operable by the movement of a vote-casting mechanism to voting position to block the corresponding opening in said front wall to prevent access to said vote-casting mechanism.

8. A voting machine including a front wall having relatively small and relatively closely spaced openings therethrough adapted to receive a stylus,
a plurality of individual vote-casting mechanisms accessible through said openings and activated by a stylus insertable through said openings, for moving said vote-casting mechanisms to voting position, and
individual vote counters removably mounted in said machine adjacent said vote-casting mechanisms, and
means for restoring the vote-casting mechanisms to their non-voting position without reversing the operation of said vote counters.

References Cited

UNITED STATES PATENTS

| | | | |
|---|---|---|---|
| 512,699 | 1/1894 | Harmsen | 235—50 |
| 667,682 | 2/1901 | Crozier | 235—54 |
| 715,805 | 12/1902 | Hoxie | 235—54 |
| 932,750 | 8/1909 | Benke | 235—54 |
| 1,055,449 | 3/1913 | Dean | 235—54 |
| 1,072,939 | 9/1913 | Gillespie | 235—54 |
| 1,614,320 | 1/1927 | Schuessler | 235—54 |
| 2,140,336 | 12/1938 | Shoup. | |
| 2,154,316 | 4/1939 | Simek | 235—56 |
| 2,179,739 | 11/1939 | Goggens | 235—51 |

RICHARD B. WILKINSON, *Primary Examiner.*

LOUIS J. CAPOZI, J. G. MURRAY, S. A. WAL,
*Assistant Examiners.*